US009275779B2

(12) United States Patent
Hojo et al.

(10) Patent No.: US 9,275,779 B2
(45) Date of Patent: Mar. 1, 2016

(54) IRON-BASED SOFT MAGNETIC POWDER FOR DUST CORE, PREPARATION PROCESS THEREOF, AND DUST CORE

(75) Inventors: Hirofumi Hojo, Takasago (JP); Masamichi Chiba, Kobe (JP); Hiroyuki Mitani, Kobe (JP); Nobuaki Akagi, Takasago (JP); Tomotsuna Kamijo, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 257 days.

(21) Appl. No.: 13/306,228

(22) Filed: Nov. 29, 2011

(65) Prior Publication Data

US 2012/0164453 A1 Jun. 28, 2012

(30) Foreign Application Priority Data

Dec. 28, 2010 (JP) ................................ 2010-294024

(51) Int. Cl.

| | |
|---|---|
| ***B32B 5/16*** | (2006.01) |
| ***C21D 11/00*** | (2006.01) |
| ***C21D 1/00*** | (2006.01) |
| ***C22C 38/00*** | (2006.01) |
| ***H01F 1/24*** | (2006.01) |
| ***H01F 41/02*** | (2006.01) |
| ***B22F 1/00*** | (2006.01) |
| ***B22F 1/02*** | (2006.01) |
| *H01F 1/26* | (2006.01) |

(52) U.S. Cl.

CPC ................ *H01F 1/24* (2013.01); *B22F 1/0085* (2013.01); *B22F 1/0088* (2013.01); *B22F 1/02* (2013.01); *H01F 41/0246* (2013.01); *B22F 2998/10* (2013.01); *H01F 1/26* (2013.01); *Y10T 428/2991* (2015.01)

(58) Field of Classification Search

None

See application file for complete search history.

(56) References Cited

U.S. PATENT DOCUMENTS 7,455,905 B2 * 11/2008 Ye et al. ........................ 428/403
7,470,333 B2 * 12/2008 Ohashi et al. ................ 148/111

(Continued)

FOREIGN PATENT DOCUMENTS

EP 1 600 987 A2 11/2005
EP 1 600 987 A3 11/2005

(Continued)

OTHER PUBLICATIONS

Toru Maeda, et al., "Development of Low-iron-loss Sintered Magnetic Material", SEI Technical Review, No. 166, Mar. 2005, pp. 1-6 (with English Abstract).

(Continued)

*Primary Examiner* — Alexandre Ferre

(74) *Attorney, Agent, or Firm* — Oblon, McClelland, Maier & Neustadt, L.L.P.

(57) ABSTRACT

Provided is an iron-based soft magnetic powder for dust core having a less coercive force, which is obtained by specifying the amount of inclusions in the iron-based powder for dust core, and at the same time, capable of decreasing the coercive force of a dust core produced using the iron-based soft magnetic powder. The iron-based soft magnetic powder for dust core is characterized by that when the cross-section of the iron-based soft magnetic powder particle is observed with a scanning electron microscope, the number of inclusions having an equivalent circle diameter from 0.1 to 3 μm is $1\times10^4$ pieces/mm$^2$ or less and the number of inclusions having an equivalent circle diameter exceeding 3 μm is 10 pieces/mm$^2$ or less.

9 Claims, 4 Drawing Sheets

(56) References Cited

U.S. PATENT DOCUMENTS

| | | | | |
|---|---|---|---|---|
| 7,767,034 | B2 * | 8/2010 | Maeda et al. | 148/306 |
| 2002/0068007 | A1 * | 6/2002 | Itoh et al. | 420/441 |
| 2005/0257854 | A1 * | 11/2005 | Maeda et al. | 148/104 |
| 2006/0214138 | A1 | 9/2006 | Ye et al. | |
| 2007/0264521 | A1 | 11/2007 | Maeda et al. | |
| 2009/0226751 | A1 | 9/2009 | Mitani et al. | |
| 2009/0295518 | A1 | 12/2009 | Nishi et al. | |

FOREIGN PATENT DOCUMENTS

| | | |
|---|---|---|
| EP | 1 918 943 A1 | 5/2008 |
| EP | 2 060 344 A1 | 5/2009 |
| JP | 1-139739 | 6/1989 |
| JP | 2005-336513 | 12/2005 |
| JP | 2007-505216 | 3/2007 |
| JP | 2007-92162 | 4/2007 |
| JP | 2010-10673 | 1/2010 |
| JP | 2010-047788 | 3/2010 |

OTHER PUBLICATIONS

Extended Search Report issued Feb. 3, 2012 in European Patent Application No. 11009460.4-1215.

Notification of Reason(s) for Refusal issued Apr. 2, 2013 in Japanese Patent Application No. 2010-294024 (with English translation).

* cited by examiner

IRON-BASED SOFT MAGNETIC POWDER FOR DUST CORE, PREPARATION PROCESS THEREOF, AND DUST CORE

FIELD OF THE INVENTION

The present invention relates to an iron-based soft magnetic powder for dust core to be used for producing a dust core for electromagnetic parts by compacting an iron-based soft magnetic powder such as iron powder or iron-based alloy powder (which may hereinafter be called "iron-based powder", collectively); a preparation process of the iron-based soft magnetic powder; a dust core; and the like.

BACKGROUND OF THE INVENTION

As a magnetic core (core material) for electromagnetic parts (such as motors) to be used with an alternating current, a stack of electrical steel sheets (electromagnetic steel plate) such as electromagnetic soft iron or silicon steel plate were used conventionally. However, they have recently been replaced by a dust core produced by compacting an iron-based soft magnetic powder and then subjecting the resulting green compact to stress relief annealing. Compaction molding of an iron-based powder increases the degree of freedom for designing the shape of a dust core, thereby facilitating production of a core having even a three-dimensional shape. It therefore enables miniaturization or weight reduction of cores compared with those obtained by stacking electromagnetic steel sheets.

Compared with a stacked core obtained by stacking electromagnetic steel sheets, a dust core produced by compacting an iron-based powder has a low iron loss, for example, at a high frequency bandwidth of 1 kHz or more, but is likely to have a more iron loss than that of a stacked core under driving conditions under which a motor is in operation (for example, at a drive frequency of a few 10 Hz to 1 kHz and a flux density of 1 T (Tesla) or more). This iron loss (that is, an energy loss upon magnetic conversion) is known to be expressed by the sum of a hysteresis loss and an eddy current loss, provided that the range is where changes in magnetic flux inside the material are not accompanied by relaxation phenomena (magnetic resonance, etc.) (refer to, for example, SEI TECHNICAL REVIEW NO. 166, published by Sumitomo Electric Industries, March, pp. 1-6(2005) (Non-patent Document 1)).

The hysteresis loss is thought to correspond to the area of a B-H (flux density—magnetic field) curve. Factors having an influence on the shape of this B-H curve and governing the hysteresis loss include, for example, a coercive force of a dust core (loop width of the B-H curve) and the maximum flux density. Since the hysteresis loss is proportionate to a coercive force, it is only necessary to decrease the coercive force in order to decrease the hysteresis loss.

The eddy current loss is, on the other hand, the Joule loss of an induced current accompanying the electromotive force produced due to electromagnetic induction in response to changes in the magnetic field. This eddy current loss is thought to be proportionate to the speed of an electromagnetic field change, that is, the square of the frequency. The smaller the electrical resistance of a dust core or the greater the area where an eddy current flows, the greater the eddy current loss. This eddy current can be roughly classified into an in-particle eddy current flowing inside individual iron-based powder particles and an inter-particle eddy current flowing between ion-based powder particles. If the individual iron-based powder particles are completely insulated therebetween, no inter-particle eddy current is produced and an eddy current consists only of in-particle eddy current, leading to a decrease in an eddy current loss.

In the iron loss, the hysteresis loss is usually dominant to the eddy current loss at a low frequency bandwidth (for example, from a few 10 Hz to 1 kHz) at which a motor is in operation so that a decrease in hysteresis loss is required. Stress relief annealing performed typically after compaction releases strain introduced upon compaction, leading to a decrease in iron loss, particularly, a hysteresis loss. But, stress relief annealing cannot reduce the hysteresis loss without limitation so that a further device for decreasing the hysteresis loss is required.

The Non-patent Document 1 discloses a technology for providing a magnetic powder with low coercive force by enhancing purity and decreasing in-particle strain as a technology for further decreasing the hysteresis loss of a dust core. This Non-Patent Document 1 also discloses improvement in properties, paying attention to effects produced by the improvement of an insulating film for providing a green compact with an increased density, increased electrical resistance, and improved heat resistance. This technology does not however include a consideration on the form of impurities in an iron-based powder. In addition, this technology lacks versatility, because it is necessary to use a high-purity iron-based powder obtained by reducing the impurity content inevitably contained therein and commercially available iron-based powders are not suited for use.

In Japanese Patent Laid-Open No. 2010-10673, disclosed is, as a controlling technology of the form of impurities in the iron-based powder, that is, an inclusion/precipitate, a technology of controlling the composition and dimension of the precipitate, enlarging the precipitate, and thereby improving the magnetic properties. Described specifically, the magnetic properties are improved by precipitating particles composed mainly of oxygen and at least one element selected from the group consisting of Nb, Ta, Ti, Zr, and V and having an average particle size of 0.02 μm or more but not more than 0.5 μm, taking out gas impurities such as O, C, and N from a parent phase of a Fe powder, and thereby cleaning the iron-based powder. This technology has a limit in improving the magnetic properties because it is a technology of producing a precipitate/inclusion that deteriorates magnetic properties.

Japanese Patent Laid-Open No. 139739/1999 proposes a technology of providing a dust core having improved magnetic properties when used under DC magnetization conditions by specifying the chemical component composition of pure iron and an area ratio of non-metallic inclusions. In this technology, the area ratio (dA+dB+dC) of non-metallic inclusions, which is specified in JIS-G0555, is defined as 0.1% or less. This document refers only to the control of an area ratio of inclusions but not to the influence of the dimension of inclusion particles, which is not sufficient for decreasing an iron loss. In addition, use of a dust core only under DC magnetization conditions is assumed in this document so that the above-described improving technology cannot be applied to a dust core used under AC magnetization conditions.

Japanese Patent Laid-Open No. 2007-92162, on the other hand, proposes a technology of providing a dust core having improved magnetic properties by controlling an impurity content in iron powder, the number of crystal grains, hardness, and the like. It is disclosed in this technology that a dust core can have improved magnetic properties by controlling the number of Si-containing inclusions having a size of 50 nm or more to 70% or more of the total number of Si-containing inclusions. In this technology, the dust core having improved properties can be obtained by controlling the size and composition of the inclusions. Existence of inclusions however limits the improvement of magnetic properties. Moreover, when the number of inclusions is great, the above-described technology is presumed to fail to produce an improving effect of magnetic properties.

Japanese Unexamined Patent Application Publication (Translation of PCT Application) No. 2007-505216 discloses a technology of providing a dust core having a low iron loss by specifying an impurity content, an oxygen content, and a specific surface area, as measured by a BET method, of annealed iron powders. This technology proposes an annealing treatment for reducing the oxygen content of the iron powder, but no consideration is given to inclusions. It is therefore presumed that this technology fails to have an improving effect of magnetic properties due to the influence of inclusions.

SUMMARY OF THE INVENTION

With the foregoing in view, the invention has been made. An object of the invention is to provide an iron-based powder (iron-based soft magnetic powder) for dust core having a less coercive force, which is obtained by specifying the amount of inclusions in the iron-based powder for dust core, and at the same time, capable of decreasing the coercive force of a dust core produced using the iron-based soft magnetic powder. Another object of the invention is to provide a method useful for the preparation of such an iron-based soft magnetic powder for dust core. A further object is to provide a dust core with a low iron loss.

The iron-based soft magnetic powder for dust core according to the invention capable of achieving the above-described objects is characterized by that it is an iron-based soft magnetic powder for dust core and when the cross-section of the iron-based soft magnetic powder particle is observed with a scanning electron microscope, the number of inclusions having an equivalent circle diameter of from 0.1 to 3 micron is $1\times10^4$ pieces/mm$^2$ or less and at the same time, the number of inclusions having an equivalent circle diameter exceeding 3 μm is 10 pieces/mm$^2$ or less. This iron-based soft magnetic powder for dust core has preferably an insulating film on the surfaces thereof. The term "equivalent circle diameter" means the diameter of a circle having an area equal to the projected area of an inclusion to be measured.

The iron-based soft magnetic powder for dust core as described above can be prepared by heat treating raw material powders in a hydrogen-containing atmosphere at 1100° C. or more under temperature/time conditions satisfying the following equation (1). The invention embraces a dust core obtained using the iron-based soft magnetic powder for dust core.

$$\text{Heat treatment temperature } (K)\times\log(\text{heat treatment time (min)})\geq 2400 \quad (1)$$

wherein the heat treatment temperature is a temperature (K) of 1100° C. or more at which the powder is retained and the heat treatment time is a time (min) for retaining the powder at the heat treatment temperature.

In the case of a multi-stage heat treatment to be conducted at a plurality of retention temperatures which are 1100° C. or more, heat treatment temperature (K)×log (heat treatment time (min)) is calculated at each heat treatment temperature (retention temperature)/heat treatment time (retention time) and this treatment is conducted so that the sum of them satisfies the equation (1), that is, 2400 or more.

According to the invention, by controlling the amount of inclusions of the iron-based soft magnetic powder for dust core, the coercive force of the iron-based soft magnetic powder itself can be reduced. By reducing the coercive force of the iron-based soft magnetic powder itself, the coercive force of the dust core available by compaction of the iron-based soft magnetic powder can be decreased. As a result, the dust core with a low iron loss can be provided.

DETAILED DESCRIPTION OF THE INVENTION

Figure 1:
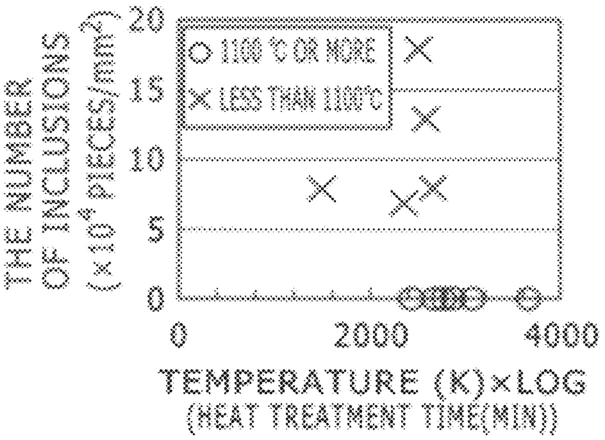
FIG. 1 is a graph showing the relationship between the heat treatment temperature (K)×log (heat treatment time (min)) and the number of inclusions.

The present inventors have proceeded with an extensive investigation in order to decrease the coercive force of a dust core and thereby improve its hysteresis loss. Paying attention to inclusions of an iron-based soft magnetic powder itself to be used as a raw material of a dust core, the present inventors have found that by appropriately decreasing the number of the inclusions depending on their dimension, the coercive force of the iron-based soft magnetic powder itself can be decreased and that a dust core produced using this iron-based soft magnetic powder can have a decreased coercive force and a decreased hysteresis loss, and thus have completed the invention.

The iron-based soft magnetic powder of the invention satisfies, when the cross-section of the powder particle is observed with a scanning electron microscope, the following requirements: (1) the number of inclusions having an equivalent circle diameter of from 0.1 to 3 μm is $1\times10^4$ pieces/mm$^2$ or less and (2) the number of inclusions having an equivalent circle diameter exceeding 3 μm is 10 pieces/mm$^2$ or less.

A typical iron powder typically contains about $1\times10^6$ pieces/mm$^2$ of inclusions and their dimension (equivalent circle diameter) is distributed from 0.01 to 3 μm. Inclusions having a dimension exceeding 3 μm (the upper limit of the dimension is about 10 μm) are observed, though rarely, and the number of such inclusions is up to about 10 pieces/mm$^2$. Inclusions cause pinning of magnetic domain walls as a principal action so that they are known to increase the coercive force. Minute inclusions are however presumed to have only a small pinning effect of magnetic domain walls.

The investigation by the present inventors has revealed that inclusions having an equivalent circle diameter less than 0.1

μm have a small pinning force; inclusions having an equivalent circle diameter exceeding 3 μm have also a small pinning force; and the number of inclusions having an equivalent circle diameter exceeding 3 μm is in fact small and such inclusions have only a small influence on the magnetic properties.

The present inventors therefore paid attention to inclusions having an equivalent circle diameter of from 0.1 to 3 μm and studied the relationship between the number of inclusions and magnetic properties. As a result, it has been found that excellent magnetic properties can be achieved by controlling, when the cross-section of the powder particle is observed with a scanning electron microscope, the number of inclusions having an equivalent circle diameter of from 0.1 to 3 μm to not greater than $1\times10^4$ pieces/mm$^2$ or less and the number of inclusions having an equivalent circle diameter exceeding 3 μm to 10 pieces/mm$^2$ or less.

The inclusions contained in the iron-based soft magnetic powder of the invention are different in their main component, depending on what alloy system the iron-based soft magnetic powder employs (which will be described later). Irrespective of the alloy system (even if it is a pure iron powder, it is influenced by impurities), however, the inclusion is a composite oxide basically containing Fe, Si, Mn, and Cr. The present inventors studied a means for decreasing the number of such inclusions.

As a result, it has been found that a method of reducing and thereby removing such a composite oxide is most suited. Described specifically, when an iron-based powder is subjected to heat treatment in a hydrogen-containing atmosphere, at 1100° C. or more, and under temperature/time conditions satisfying the below-described equation (1), inclusions inside the iron-based powder are reduced/decomposed and with removal of a gas component, a metal element forms a solid solution in the iron.

$$\text{Heat treatment temperature } (K)\times\log\text{ (heat treatment time (min))}\geq 2400 \quad (1)$$

wherein the heat treatment temperature is a temperature (K) of 1100° C. or more at which the powder is retained and the heat treatment time is a time (min) for retaining the powder at the heat treatment temperature.

In ordinary materials such as sheet or rod, a distance from the surface to the inside is large, which makes it difficult to sufficiently reduce the inside of the material even if the atmosphere is controlled to be reductive. It is not the common practice to remove a composite oxide from such materials by reduction. In the case of an iron-based powder, on the other hand, the distance from the surface to the inside is small so that it is possible to reduce even the inside of the powder in a reducing atmosphere. Since a reduction reaction proceeds at a temperature of 1100° C. or more and it is a diffusion-controlled reaction of oxygen atoms, the reduction/decomposition of inclusions present inside the iron-based powder does not proceed and the number of inclusions having an equivalent circle diameter from 0.1 to 3 micron cannot be controlled to $1\times10^4$ pieces/mm$^2$ or less when the atmospheric temperature becomes less than 1100° C. or the heat treatment temperature (K)×log (heat treatment time (min)) is less than 2400.

As described above, in the iron-based soft magnetic powder of the invention, the number of inclusions is controlled, depending on the dimension of them so that a dust core having a less coercive force and a less hysteresis loss can be obtained. It is however necessary to reduce an eddy current loss, in addition to a hysteresis loss, in order to prepare a dust core having a less iron loss.

In order to reduce an eddy current loss, presence of an insulator on the interface between iron-based soft magnetic powders is necessary when they are molded by compaction. For allowing an insulator to exist on the interface between iron-based soft magnetic powders, iron-based soft magnetic powders having, on the surface thereof, an insulating film may be compacted or a mixture of the iron-based soft magnetic powder and an insulating powder may be compacted. It is preferred to compact iron-based soft magnetic powders having, on the surface thereof, an insulating film.

No particular limitation is imposed on the kind of the insulating film or insulating powder and any known one can be used. For example, any insulating film or insulating powder can be used insofar as, when the specific resistance of the resulting dust core (compact) is measured using a four-terminal method, the specific resistance is about 50 μΩ·m or more, preferably 100 μΩ·m or more.

As the insulating film, an inorganic chemical conversion film or a resin film may be used. The inorganic chemical conversion film and the resin film may be formed singly on the surface of the iron-based powder. Alternatively, the resin film may be formed on the surface of the inorganic chemical conversion film. Examples of the inorganic chemical conversion film include phosphoric acid-based chemical conversion films and chromium-based chemical conversion films.

Examples of a resin constituting the resin film include olefin resins such as silicone resin, phenolic resin, epoxy resin, phenoxy resin, polyamide resin, polyimide resin, polyphenylene sulfide resin, styrene resin, acrylic resin, styrene/acrylic resin, ester resin, urethane resin, and polyethylene, carbonate resin, ketone resin, fluorine resins such as fluoride methacrylate and vinylidene fluoride, and engineering plastics such as PEEK and modified products thereof.

Of such insulating films, the phosphoric acid-based chemical conversion film is particularly preferred. The phosphoric acid-based chemical conversion film is a glassy film formed by chemical conversion treatment with orthophosphoric acid ($H_3PO_4$) or the like and it is excellent in electrical insulation properties.

The phosphoric acid-based chemical conversion film usable in the invention may contain Mg or B. In this case, the content of each of Mg and B is preferably from 0.001 to 0.5 mass % in 100 mass % of the iron-based powder after formation of the phosphoric acid-based chemical conversion film.

The phosphoric acid-based chemical conversion film has a thickness of preferably from about 1 to 250 nm. Phosphoric acid-based chemical conversion films having a thickness less than 1 nm cannot easily produce an insulation effect. Those having a thickness exceeding 250 nm are however not desired because an insulation effect is saturated and they hinder a density increase of a green compact. As a deposition amount, a range of from 0.01 to 0.8 mass % is preferred.

In the invention, formation of a silicone resin film on the surface of the phosphoric acid-based chemical conversion film is recommended. The silicone resin film is effective for, as well as improving the thermal stability of electrical insulation properties, enhancing the mechanical strength of a dust core. Upon completion of a crosslinking/curing reaction of the silicone resin (upon compaction into a green compact), Si—O bonds excellent in heat resistance are formed so that the resulting insulating film has excellent thermal stability. In addition, firm bonding between powders leads to an increase in mechanical strength. The silicone resin film has a thickness of preferably from 1 to 200 nm, more preferably from 1 to 100 nm.

The total thickness of the phosphoric acid-based chemical conversion film and the silicone resin film is preferably 250 nm or less. When the thickness of the insulating film exceeds 250 nm, a reduction in flux density of the resulting dust core sometimes becomes large. It is desired to increase the thickness of the phosphoric acid-based chemical conversion film greater than that of the silicone resin film in order to obtain a dust core having a small iron loss.

The deposition amount of the silicone resin film is controlled to preferably from 0.05 to 0.3 mass % when the total amount of the iron-based powder having a phosphoric acid-based chemical conversion film thereon and the silicone resin film is 100 mass %. The deposition amounts of the silicone resin film less than 0.05 mass % leads to poor insulation properties and low electrical resistance. The deposition amounts of the silicone resin film exceeding 0.3 mass %, on the other hand, do not easily provide a dust core (compact) having a high density.

Compaction of an iron-based powder having, on the surface thereof, an insulating film was described above mainly. The invention is not limited to it, but a mixture of an iron-based powder having a surface covered with an inorganic matter such as the phosphoric acid-based chemical conversion film or chromium-based chemical conversion film with an insulating powder made of the above-described resin may be compacted. When the mixture is used, the amount of the resin to be mixed is adjusted to preferably from 0.05 to 0.5 mass % based on the total amount of the mixed powders.

The iron-based soft magnetic powder of the invention may further contain a lubricant. Due to the action of this lubricant, frictional resistance between the iron-based soft magnetic powders or between the iron-based soft magnetic powder and the inner wall of a molding die can be reduced upon compaction of the iron-based soft magnetic powder and die galling of the compact or heat generation during compaction can therefore be prevented.

In order to produce such an effect effectively, the lubricant is contained in an amount of preferably 0.2 mass % or more based on the whole amount of the powders. An increase in the amount of the lubricant is not effective for increasing the density of the green compact so that the amount is kept to preferably 0.8 mass % or less. When the lubricant is applied onto the inner wall surface of a molding die and then compaction is performed (die-wall lubrication compaction), the amount of the lubricant may be less than 0.2 mass %.

As the lubricant, those conventionally known may be used. Specific examples include powders of a metal salt of stearic acid such as zinc stearate, lithium stearate, and calcium stearate, paraffin, wax, and natural or synthesis resin derivatives.

The iron-based powder for dust core according to the invention is of course used for the production of a dust core. A dust core obtained by compacting the iron-based soft magnetic powder of the invention is embraced in the invention. This dust core is used mainly as a rotor for motors or as a core for stators, each operated with AC.

The iron-based soft magnetic powder of the invention satisfies the above-described requirements. No particular limitation is imposed on the preparation process of the powder and it can be prepared using, for example, an atomizing method. The kind of the atomizing method is not particularly limited and either a water atomizing method or a gas atomizing method can be used.

The raw material iron-based powder is a metallic ferromagnetic powder. Specific examples include pure iron powder and iron-based alloy powders (such as Fe—Al alloy, Fe—Si alloy, Fe—Si—Al alloy, Fe—Ni alloy, Fe—Co alloy, Fe—Cr alloy, and Fe—Si—Cr alloy).

In the invention, even powders obtained using the water atomizing method can be used preferably as the raw material iron-based powder. An iron-based powder obtained using the water atomizing method is more inexpensive than that obtained using the gas atomizing method, but the coercive force of a dust core produced using the iron-based powder obtained using the water atomizing method tended to be greater than that of a dust core produced using the iron-based powder obtained using the gas atomizing method.

The reason of this tendency was investigated by the present inventors. As a result, it has been found that due to inclusions produced by contact of a molten steel with water upon atomizing, the iron-based powder obtained using the water atomizing method contains more inclusions and that a dust core produced using this iron-based powder has therefore a large coercive force. According to the invention, however, by carrying out a reduction treatment to decrease the number of inclusions, a dust core having a less coercive force can be obtained even from the iron-based powder obtained using the water atomizing method.

The dust core can be produced only by compacting the iron-based powders having on the surface thereof the insulating film (for example, an iron-based powder having on the surface thereof the phosphoric acid-based chemical conversion film or an iron-based powder having on the surface of a phosphoric acid-based chemical conversion film thereof, a silicone resin film), followed by stress relief annealing.

No particular limitation is imposed on the compaction method and known method can be employed. The compaction is performed preferably at a pressure of contacted surface from 490 to 1960 MPa (more preferably, from 790 MPa to 1180 MPa). The compaction can be performed as either room temperature compaction or warm compaction (at from 80 to 250° C.). Warm compaction with die-wall lubrication is more preferred because a dust core having a higher strength can be obtained. After compaction, stress relief annealing is performed to provide a dust core having a less hysteresis loss. No particular limitation is imposed on the stress relief annealing and any known condition can be employed.

The stress relief annealing may be performed in any atmosphere without particular limitation, but an inert gas atmosphere such as nitrogen is preferred. The stress relief annealing time is not particularly limited and it is performed preferably for 20 minutes or more, more preferably 30 minutes or more, still more preferably 1 hour or more.

EXAMPLES

The present invention will hereinafter be described more specifically based on examples. The invention is however not limited by the following examples and they can be carried out after changed properly within the spirit described above or to be described later. All of them are embraced in the technical scope of the invention.

Pure iron powders ("ML35N", trade name; product of Kobe Steel, average particle size: 140 gm) were used as an iron-based soft magnetic powder. The iron powders were extracted with a sieve having an opening of from 150 μm to 250 μm. The resulting powders (1 kg) having an average particle size of from 250 to 150 μm were heat treated using a mesh belt conveyer furnace while introducing, to the entrance of the furnace, a hydrogen atmosphere at 4000 L (liter)/min and nitrogen at 3000 L/min and adjusting a belt speed to enable heating at from 1000 to 1200° C. for from 90 minutes to 450 minutes.

After the heat treatment, 5 cc of a liquid for preparing an iron phosphate chemical conversion film having a phosphoric acid concentration of 1.5 mass % was added. The resulting mixture was mixed for 30 minutes or more by using a V-shaped mixer, dried in the air at 200° C. for 30 minutes, and then passed through a sieve having an opening of 300 μm. Diffusion of atoms does not proceed at a temperature of about 200° C. so that no change occurs in the amount of inclusions inside the iron powders.

Then, a silicone resin "SR2400" (trade name; product of Dow Corning Toray) was diluted in toluene to prepare a resin solution having a solid concentration of 4.8 mass %. The resulting resin solution was mixed with the iron powders to give a resin solid content of 0.1%. After heating and drying at 75° C. for 30 minutes in the air in an oven furnace, the resulting mixture was passed through a sieve having an opening of 300 μm.

Further, zinc stearate was applied to a molding die heated to 130° C. and the powders heated to 130° C. were compacted using the resulting molding die at a pressure of contacted surface of 1176 MPa. The compact (green compact) thus obtained was ring-shaped with an outer diameter of 45 mm, an inner diameter of 33 mm, and a height of 5 mm.

The compact thus obtained was annealed in a nitrogen atmosphere at 600° C. for 30 minutes. The heating rate at that time was adjusted to about 10° C./min. After cooling the furnace, the sample was taken out therefrom. The annealing atmosphere was a non-oxidizing atmosphere so that oxides, that is, inclusions were not produced in the iron powders and therefore, no change in the amount of inclusions occurred also in the annealing step.

After the ring-shaped test piece (after annealing) was provided with a primary winding of 400 turns and a secondary winding of 25 turns, the coercive force was measured using a B-H curve tracer ("BHS-40S", trade name; product of Riken Electron). The maximum excitation magnetic field was set at 10000 A/m. In addition, the iron loss of it was measured using an automatic magnetism measurement apparatus (product of METRON Inc.) at an excitation flux density of 1.0 T (Tesla) and a frequency of 400 MHz.

On the other hand, the cross-section of the powders obtained by the heat treatment was mirror polished and the backscattered electron image (scanning electron micrograph) was observed using FE-SEM (field emission type scanning electron microscope) at an accelerating voltage of 10 kV and at a magnification of 10000. As the observed area, any ten images each made of 150 $\mu m^2$ of a field of view were used (total area: 1500 $\mu m^2$). Based on the image analysis, the number of inclusions having an equivalent circle diameter from 0.1 to 3 μm and the number of inclusions having an equivalent circle diameter exceeding 3 μm were counted.

Figure 2:
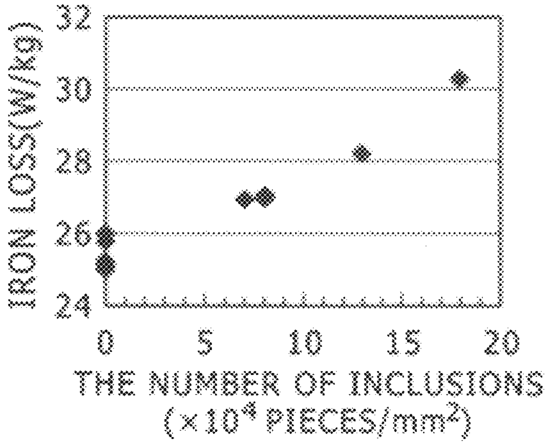
FIG. 2 is a graph showing the relationship between the number of inclusions and an iron loss.
Figure 3:
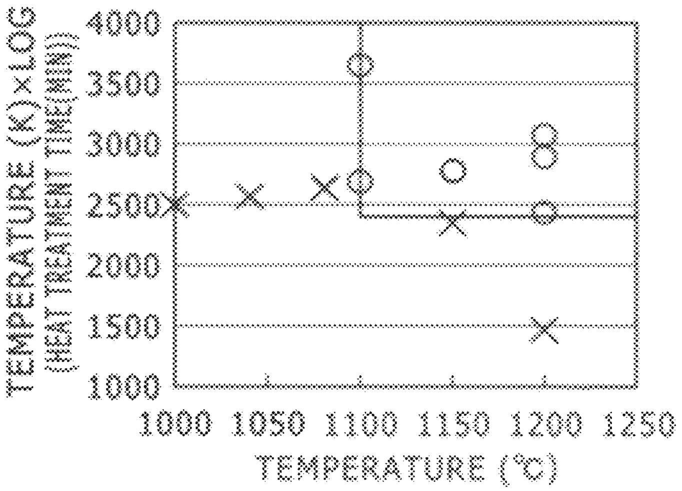
FIG. 3 is a graph showing an influence, on magnetic properties, of the heat treatment temperature (K)×log (heat treatment time (min)) and temperature (heat treatment temperature)

The number of powdery inclusions obtained under each of the heat treatment conditions and a coercive force and iron loss of a compact (after annealing) obtained using these powders are collectively listed below in Table 1 (Test Nos. 1 to 11). In addition, the heat treatment temperature (in terms of K), heat treatment time (log t: t is time (min)), and (heat treatment temperature (K)×(heat treatment time (log t)) are listed below in Table 2. Based on these results, the relationship between the parameter and the number of inclusions and the relationship between the number of inclusions and iron loss are shown in FIG. 1 and FIG. 2, respectively. Influences of the parameter and temperature (heat treatment temperature) on the magnetic properties are shown in FIG. 3 (in this diagram, "○" means Examples satisfying the magnetic properties, while "×" means Comparative Examples not satisfying the magnetic properties).

Figure 4:
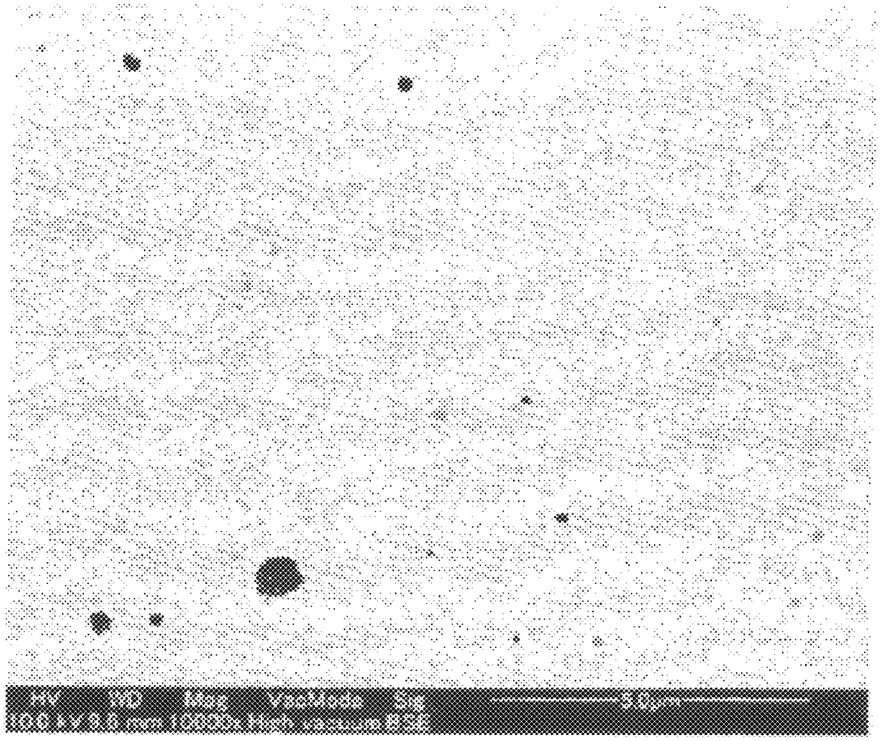
FIG. 4 is a scanning electron micrograph showing the cross-section of an iron-based soft magnetic powder particle before heat treatment.
Figure 5:
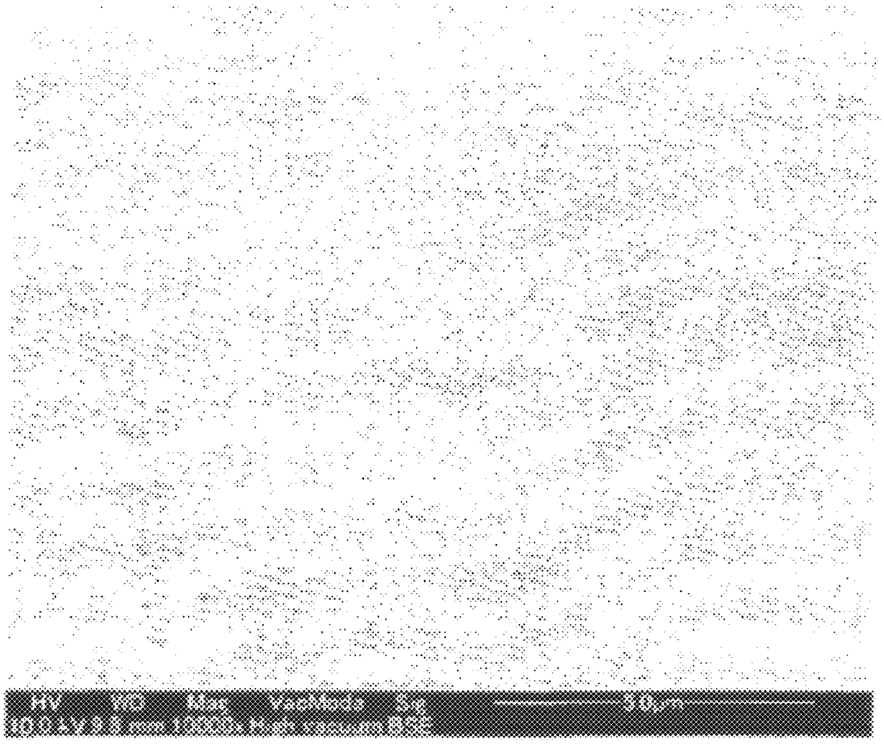
FIG. 5 is a scanning electron micrograph showing the cross-section of an iron-based soft magnetic powder when heat treated at 1200° C.×90 min.
Figure 6:
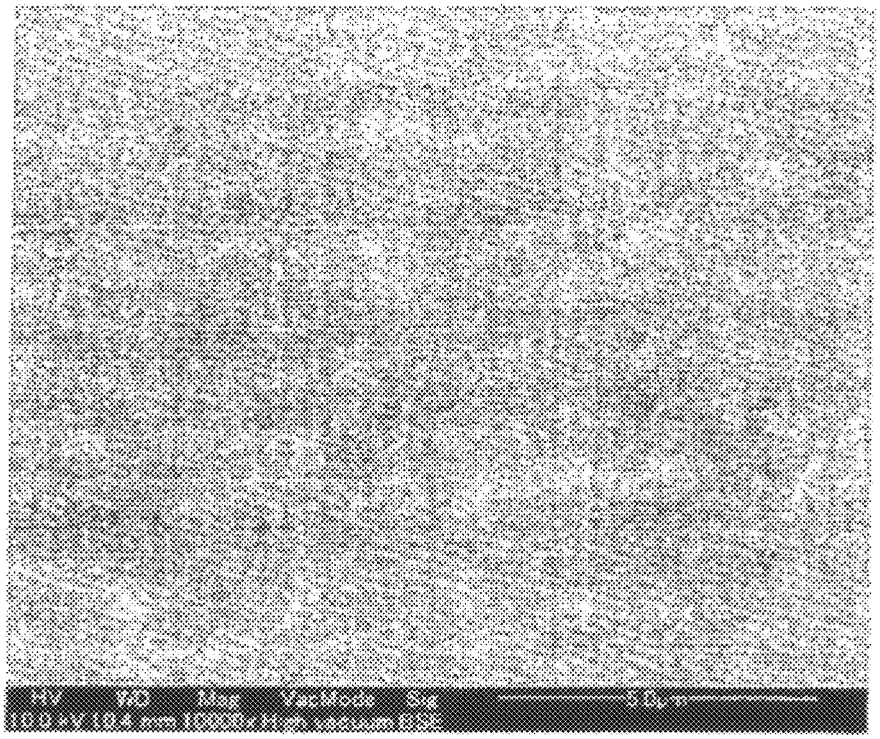
FIG. 6 is a scanning electron micrograph showing the cross-section of an iron-based soft magnetic powder particle when heat treated at 1100° C.×450 min.
Figure 7:
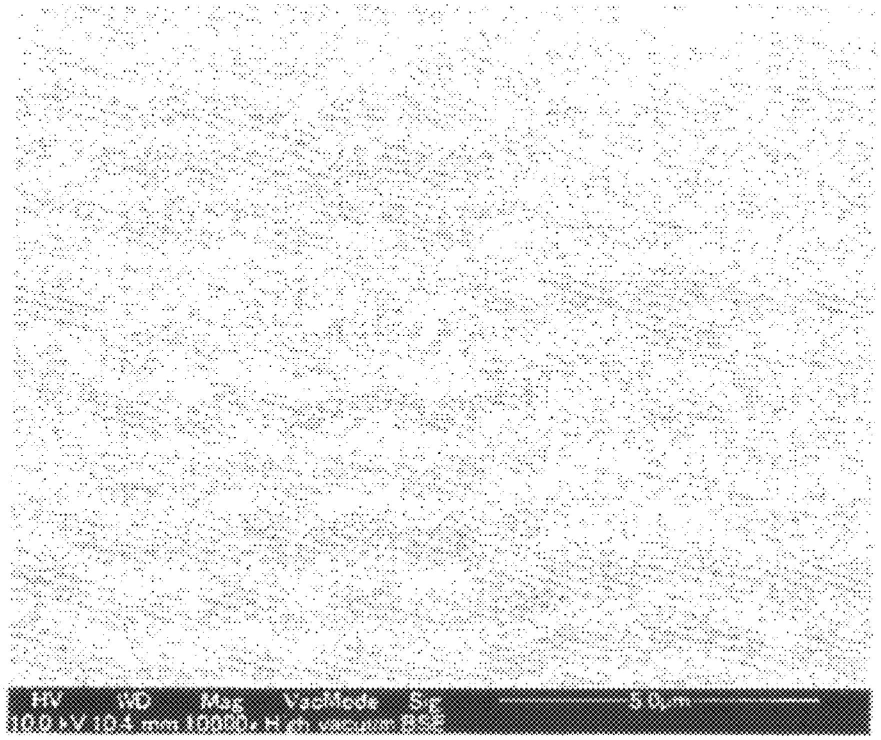
FIG. 7 is a scanning electron micrograph showing the cross-section of an iron-based soft magnetic powder particle when heat treated at 1100° C.×90 min.
Figure 8:
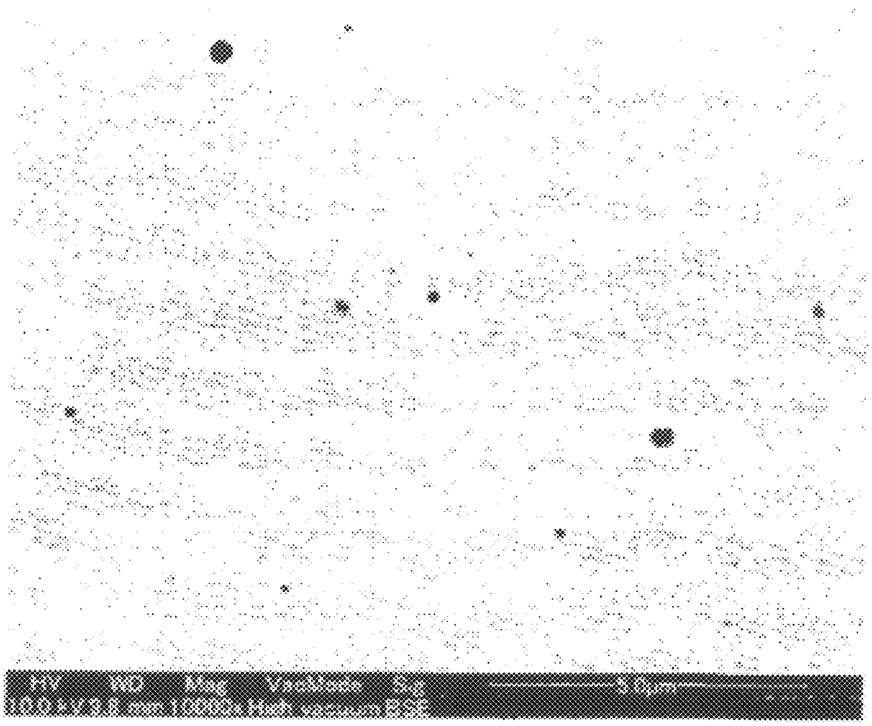
FIG. 8 is a scanning electron micrograph showing the cross-section of an iron-based soft magnetic powder particle when heat treated at 1080° C.×90 min.

The cross-section of the iron-based soft magnetic powder particle before heat treatment is shown in FIG. 4 (scanning electron micrograph). The cross-section of the iron-based soft magnetic powder particle (Test No. 2) when heat treated at 1200° C.×90 minutes is shown in FIG. 5 (scanning electron micrograph). The cross-section of the iron-based soft magnetic powder particle (Test No. 7) when heat treated at 1100° C.×450 minutes is shown in FIG. 6 (scanning electron micrograph). The cross-section of the iron-based soft magnetic powder particle (Test No. 8) when heat treated at 1100° C.×90 minutes is shown in FIG. 7 (scanning electron micrograph). The cross-section of the iron-based soft magnetic powder particle (Test No. 9) when heat treated at 1080° C.×90 minutes is shown in FIG. 8 (scanning electron micrograph).

| Test No. | Heat treatment temperature (° C.) | Heat treatment time (min) | The number of inclusions having an equivalent circle diameter from 0.1 to 3 μm (pieces/mm²) | The number of inclusions having an equivalent circle diameter exceeding 3 μm (pieces/mm²) | Coercive force of compact (A/m) | Iron loss (W/kg) |
|---|---|---|---|---|---|---|
| 1 | 1200 | 120 | 0 | 0 | 105 | 25.3 |
| 2 | 1200 | 90 | 0 | 0 | 105 | 25.3 |
| 3 | 1200 | 45 | 0 | 0 | 104 | 25.2 |
| 4 | 1200 | 10 | $8\times10^4$ | 8 | 113 | 27.1 |
| 5 | 1150 | 90 | 0 | 0 | 108 | 25.8 |
| 6 | 1150 | 45 | $7\times10^4$ | 7 | 112 | 27.0 |
| 7 | 1100 | 450 | 0 | 0 | 104 | 25.1 |
| 8 | 1100 | 90 | 0 | 0 | 108 | 26.1 |
| 9 | 1080 | 90 | $8\times10^4$ | 8 | 115 | 27.0 |
| 10 | 1040 | 90 | $13\times10^4$ | 13 | 120 | 28.2 |
| 11 | 1000 | 90 | $18\times10^4$ | 18 | 128 | 30.3 |

TABLE 2

| Test No. | Heat treatment temperature (K) | Heat treatment time (log t) | Heat treatment temperature (K) × heat treatment time (log t) |
|---|---|---|---|
| 1 | 1473 | 2.08 | 3063 |
| 2 | 1473 | 1.95 | 2879 |
| 3 | 1473 | 1.65 | 2435 |
| 4 | 1473 | 1.00 | 1473 |
| 5 | 1423 | 1.95 | 2781 |
| 6 | 1423 | 1.65 | 2353 |
| 7 | 1373 | 2.65 | 3643 |
| 8 | 1373 | 1.95 | 2683 |
| 9 | 1353 | 1.95 | 2644 |

TABLE 2-continued

| Test No. | Heat treatment temperature (K) | Heat treatment time (log t) | Heat treatment temperature (K) × heat treatment time (log t) |
|---|---|---|---|
| 10 | 1313 | 1.95 | 2566 |
| 11 | 1273 | 1.95 | 2488 |

The following conclusion can be drawn from the above-described results. With an increase in the heat treatment temperature, the number of inclusions decreases and no inclusion is observed after the heat treatment at 1100° C. or more and under temperature/time conditions satisfying the following equation:

$$\text{heat treatment temperature (K)} \times \log(\text{heat treatment time (min)}) \geq 2400$$

(FIG. 1 and FIGS. 5 to 7). Reduction treatment is presumed to have an inclusion decreasing effect. In addition, with a decrease in the number of inclusions, a decrease in iron loss can be observed (FIG. 2).

It has been found that with a decrease in the number of inclusions, both an iron loss and the coercive force of the resulting compact decrease (Test Nos. 1 to 3, 7, and 8). The iron loss which is required in practical use is 27 W/kg or less so that the above results suggest that a dust core with a low iron loss can be obtained by the invention.

It has been found, on the contrary, that when the number of inclusions in the iron-based soft magnetic powder increases (Test Nos. 4, 6, 9 to 11), the compact obtained using it has an increased coercive force and an insufficiently decreased iron loss.

What is claimed is:

1. An iron-based soft magnetic powder, wherein when a cross-section of a particle of the iron-based soft magnetic powder is observed with a scanning electron microscope, a number of inclusions of composite oxide having an equivalent circle diameter from 0.1 to 3 μm is $1\times10^4$ pieces/mm$^2$ or less and a number of inclusions of composite oxide having an equivalent circle diameter exceeding 3 μm is 10 pieces/mm$^2$ or less, and wherein the powder is suitable for a dust core.

2. The iron-based soft magnetic powder according to claim 1, comprising an insulating film formed on a surface thereof.

3. A dust core comprising the iron-based soft magnetic powder according to claim 1 or 2.

4. The iron-based soft magnetic powder according to claim 1, having an iron loss of 27 W/Kg or less.

5. The iron-based soft magnetic powder according to claim 1, comprising a phosphoric acid-based chemical conversion film formed on a surface thereof.

6. The iron-based soft magnetic powder according to claim 5, wherein the phosphoric acid-based chemical conversion film has a thickness of 1 to 250 nm.

7. The iron-based soft magnetic powder according to claim 5, further comprising a silicone resin film on the surface of the phosphoric acid-based chemical conversion film.

8. The iron-based soft magnetic powder according to claim 7, wherein the silicone resin film has a thickness of 1 to 200 nm.

9. A process of preparing the iron-based soft magnetic powder of claim 1, the process comprising:

heat treating a raw material powder in a hydrogen-containing atmosphere at 1100° C. or greater and under temperature/time conditions satisfying equation (1):

$$\text{heat treatment temperature (K)} \times \log(\text{heat treatment time (min)}) \geq 2400 \quad (1)$$

wherein heat treatment temperature is a temperature of 1100° C. or more at which the powder is retained and heat treatment time is a time (min) for retaining the powder at the heat treatment temperature.

* * * * *